US007412202B2

(12) United States Patent
Gutta et al.

(10) Patent No.: US 7,412,202 B2
(45) Date of Patent: Aug. 12, 2008

(54) METHOD AND APPARATUS FOR GENERATING RECOMMENDATIONS BASED ON USER PREFERENCES AND ENVIRONMENTAL CHARACTERISTICS

(75) Inventors: Srinivas Gutta, Buchanan, NY (US); Mi-Suen Lee, Ossining, NY (US); Lalitha Agnihotri, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 929 days.

(21) Appl. No.: 09/825,328

(22) Filed: Apr. 3, 2001

(65) Prior Publication Data
US 2002/0142722 A1    Oct. 3, 2002

(51) Int. Cl.
H04H 20/71    (2008.01)
H04Q 7/20    (2006.01)
H04N 5/445    (2006.01)
G06F 17/30    (2006.01)

(52) U.S. Cl. .................. 455/3.01; 455/3.04; 455/456.3; 455/432.3; 455/186.1; 725/46; 705/10

(58) Field of Classification Search ............. 455/414.1, 455/414.3, 3.01–3.04, 432.3, 456.1, 456.5; 705/10, 26; 725/45, 46
See application file for complete search history.

(56) References Cited

U.S. PATENT DOCUMENTS

| 4,641,367 | A |   | 2/1987  | Van Deursen et al. ..... 455/161.2 |
|---|---|---|---|---|
| 5,590,246 | A | * | 12/1996 | Asgharzadeh et al. ........ 358/1.9 |
| 5,784,539 | A | * | 7/1998  | Lenz .......................... 706/45 |
| 6,005,597 | A | * | 12/1999 | Barrett et al. ................. 725/46 |
| 6,209,026 | B1| * | 3/2001  | Ran et al. ................... 709/218 |
| 6,236,978 | B1| * | 5/2001  | Tuzhilin ...................... 705/26 |
| 6,266,649 | B1| * | 7/2001  | Linden et al. ................. 705/26 |
| 6,370,513 | B1| * | 4/2002  | Kolawa et al. ................. 705/10 |
| 6,463,382 | B1| * | 10/2002 | Bullock ...................... 701/117 |
| 6,571,279 | B1| * | 5/2003  | Herz et al. ................... 709/217 |

(Continued)

FOREIGN PATENT DOCUMENTS

EP    0233967    2/1986

(Continued)

OTHER PUBLICATIONS

Ellis et al, "Enhanced Radio System", Provisional Application, Feb. 20, 2001.*

(Continued)

*Primary Examiner*—Duc M Nguyen

(57) ABSTRACT

A recommendation system is disclosed that generates recommendations for one or more items based on user preferences and one or more environmental factors. The user's preferences are learned under various environmental conditions using an environmental data collection system. The observed environmental conditions may include, for example, location, characteristics of the location, weather or characteristics of the user's motion, such as a rate of movement. For each positive and negative behavioral example, a number of attributes of the selected item are classified in the user profile together with the prevailing environmental conditions. When recommending an item, the disclosed recommender retrieves the user preferences and evaluates the current environmental conditions. A recommendation score can be generated for each available item based on the user's demonstrated preferences under similar environmental conditions, such as in the same or a similar geographic area or under similar weather conditions.

35 Claims, 6 Drawing Sheets

U.S. PATENT DOCUMENTS

| | | | |
|---|---|---|---|
| 6,636,836 B1* | 10/2003 | Pyo | 705/26 |
| 6,704,931 B1* | 3/2004 | Schaffer et al. | 725/46 |
| 6,822,557 B1* | 11/2004 | Weber | 340/425.5 |
| 6,851,090 B1* | 2/2005 | Gutta et al. | 715/716 |
| 6,947,922 B1* | 9/2005 | Glance | 707/3 |
| 6,968,334 B2* | 11/2005 | Salmenkaita et al. | 707/10 |
| 6,975,910 B1* | 12/2005 | Brown et al. | 700/90 |
| 2002/0052873 A1* | 5/2002 | Delgado et al. | 707/7 |
| 2002/0077931 A1* | 6/2002 | Henrion et al. | 705/26 |
| 2002/0199194 A1* | 12/2002 | Ali | 725/46 |
| 2004/0068552 A1* | 4/2004 | Kotz et al. | 709/218 |
| 2004/0116088 A1* | 6/2004 | Ellis et al. | 455/132 |
| 2005/0020223 A1* | 1/2005 | Ellis et al. | 455/486.1 |

FOREIGN PATENT DOCUMENTS

| | | |
|---|---|---|
| EP | 0431694 | 12/1990 |
| EP | 0508369 | 4/1992 |
| JP | 1013192 | 1/1998 |

OTHER PUBLICATIONS

"What is RDS?," Issue Date Jan. 3, 2000, downloaded from http://www.rds.org.uk/rds98/whatisrds.htm on Mar. 27, 2001.

AvantGo radio-locator Travel Guide, "Radio-locator," downloaded from http://www.radio-locator.com/. on Mar. 28, 2001.

\* cited by examiner

AUDIO PROGRAM DATABASE - 200

| DATE/TIME 240 | STATION 245 | GEOGRAPHIC AREA 248 | TITLE 250 | PROGRAM TYPE(S) 255 | ... | PERFORMERS 270 |
|---|---|---|---|---|---|---|
| 11/18/99 -- 8:00 P.M. | WPXI | NYC | CASEY'S COUNTDOWN | TOP 40 | | VARIOUS ARTISTS |
| 11/18/99 -- 8:30 P.M. | WNWE | PHILADELPHIA | FINANCE UPDATE | FINANCE; TALK;TRAFFIC | | JOE BANKER |
| ... | | | | | | |
| 11/18/99 -- 9:00 P.M. | WPJL | NYC | GREATEST HITS | ADULT CONTEMPORARY | | VARIOUS ARTISTS |

205 — row 1
210 — row 2
220 — row 4

FIG. 2

| | TIME 320 | STATION 325 | PROGRAM TYPE 1 330 | ... | PROGRAM TYPE N 335 | PERFORMERS 340 | ENVIRONMENTAL OBSERVATIONS 345 | CLASS 350 |
|---|---|---|---|---|---|---|---|---|
| | | | | | LISTENING HISTORY (POSITIVE EXAMPLES) 300-1 | | | |
| 301 | 1930 | WPAX | TOP 40 | ... | N/A | VARIOUS ARTISTS | LOCATION(S): WESTCHESTER COUNTY; LOCATION CHARACTERISTICS: SUBURBAN; RURAL; WEATHER: CLEAR; SUNNY; MOVEMENT CHARACTERISTICS: 55 MPH | POS |
| 302 | ... | ... | ... | ... | ... | ... | ... | ... |
| 303 | 1900 | WTKU | TALK RADIO | ... | TRAFFIC; FINANCE | JOE BANKER (HOST) | LOCATION(S): NEW YORK CITY; LOCATION CHARACTERISTICS: URBAN; WEATHER: PARTIALLY CLOUDY; 50 DEGREES; MOVEMENT CHARACTERISTICS: 15 MPH; STOP-AND-GO TRAFFIC | POS |

FIG. 3A

| | TIME 320 | STATION 325 | PROGRAM TYPE 1 330 | ... | PROGRAM TYPE N 335 | PERFORMERS 340 | ENVIRONMENTAL OBSERVATIONS 345 | CLASS 350 |
|---|---|---|---|---|---|---|---|---|
| 305 | 0530 | WCTR | COUNTRY | | NASHVILLE | FAITH RHYMES; TIM GARTH | LOCATION(S): WESTCHESTER COUNTY<br><br>LOCATION CHARACTERISTICS: SUBURBAN; RURAL<br><br>WEATHER: CLEAR; SUNNY<br><br>MOVEMENT CHARACTERISTICS: 55 MPH | NEG |
| 306 | ... | ... | ... | ... | ... | ... | ... | ... |
| 307 | 1400 | WPJL | CLASSICAL | | TRAFFIC; WEATHER | JANE MUSIC (HOST) | LOCATION(S): NEW YORK CITY<br><br>LOCATION CHARACTERISTICS: URBAN<br><br>WEATHER: PARTIALLY CLOUDY; 50 DEGREES<br><br>MOVEMENT CHARACTERISTICS: 15 MPH; STOP-AND-GO TRAFFIC | NEG |

LISTENING HISTORY (NEGATIVE EXAMPLES) 300-2

FIG. 3B

USER PROFILE 360

| RULE IDENTIFIER 380 | CONDITIONS 385 | RECOMMENDATION 390 |
|---|---|---|
| RULE 1 | TIME > 1830 & TIME <= 1930 & PROGRAM TYPE = TALK RADIO & LOCATION CHARACTERISTICS = URBAN | POS [98.5%] |
| RULE 2 | TIME > 1430 & PROGRAM TYPE = TOP 40 & WEATHER = SUNNY | POS [96.5%] |
| RULE 3 | TIME > 600 & MOVEMENT CHARACTERISTICS = AVG SPEED > 45 MPH | NEUTRAL |
| ... | | |
| RULE N | DEFAULT | NEG [100.0%] |

METHOD AND APPARATUS FOR GENERATING RECOMMENDATIONS BASED ON USER PREFERENCES AND ENVIRONMENTAL CHARACTERISTICS

FIELD OF THE INVENTION

The present invention relates to recommendation systems, such as recommenders for audio programming, television programming or other content, and more particularly, to a method and apparatus for generating recommendations based on environmental characteristics, such as the geographic location, characteristics of the location or the weather.

BACKGROUND OF THE INVENTION

The consumer marketplace offers numerous electronic devices that reproduce pre-recorded or transmitted audio content. Portable radios, for example, allow a user to receive a transmitted audio signal from virtually any location. Generally, a transmitted radio signal from a given radio station may be received at an assigned frequency within a certain radius of the station's transmitting antenna. As a user moves away from the transmitting antenna, the received signal gradually degrades until the user eventually must select a new radio station. If the user enters an unfamiliar radio market, the user must generally scan the frequency spectrum to select another suitable radio station. Even in a geographic region that is familiar to the user, the increasing number of frequencies that are used for radio stations in the VHF and FM frequency ranges makes it increasingly challenging to select a desired radio station.

A number of techniques have been proposed or suggested to help a user select a new radio station. The radio data system (RDS) standard from the European Broadcasting Union (EBU), for example, includes a program type (PTY) field associated with each radio signal to specify the corresponding program type. A number of radio receivers are currently available that display the transmitted program type information with the selected radio station. Thus, if a user enjoys "talk radio," the user can select a station having a "talk radio" program type. The program type code can be used, for example, to enable suitable receivers and recorders to be pre-set to respond only to programs of the desired type.

While such techniques for selecting an alternate radio station are capable of selecting a new radio station of the same program type that the user was already listening to, the selection is not influenced by the current location of the user or other environmental factors. For example, in a given geographic area, the user may have a preferred radio station having a program type that is distinct from the user's program type preferences in his or her home area.

A need therefore exists for a method and apparatus for making recommendations based on the preferences of the user and environmental characteristics, such as location, characteristics of the location or weather. A further need exists for a method and apparatus for learning a users preferences under various environmental characteristics. Yet another need exists for a method and apparatus for selecting an alternate radio station or another item based on the users demonstrated preferences under similar environmental characteristics, such as in the same or a similar geographic area.

SUMMARY OF THE INVENTION

Generally, a recommendation system is disclosed that generates recommendations for one or more items based on preferences of the user and one or more environmental characteristics. The disclosed recommender learns the users preferences under various environmental characteristics using an environmental data collection system. The observed environmental characteristics may include, for example, location, characteristics of the location, weather or characteristics of the users motion, such as a rate of movement.

The users behavior is monitored in order to derive the users preferences under various environmental characteristics. For each positive and negative behavioral example (such as radio stations listened to or not listened to), a number of attributes of the selected item are classified in the user profile together with the prevailing environmental characteristics. Thereafter, when recommending an item, such as an alternate radio station, the disclosed recommender retrieves the user profile(s) and evaluates the current environmental characteristics. A recommendation score can be generated for each available item based on the users demonstrated preferences under similar environmental characteristics, such as in the same or a similar geographic area or under similar weather conditions.

A more complete understanding of the present invention, as well as further features and advantages of the present invention, will be obtained by reference to the following detailed description and drawings.

BRIEF DESCRIPTION OF THE DRAWINGS

FIG. 2 illustrates a sample table from the audio program database of FIG. 2;

FIG. 3A illustrates a sample table from a listening history (positive examples) used by an exemplary decision tree (DT) recommender;

FIG. 3B illustrates a sample table from a listening history (negative examples) used by an exemplary decision tree (DT) recommender;

FIG. 3C illustrates a sample table from a viewer profile generated by a decision tree (DT) recommender from the viewing history of FIGS. 3A and 3B.

DETAILED DESCRIPTION

Figure 1:
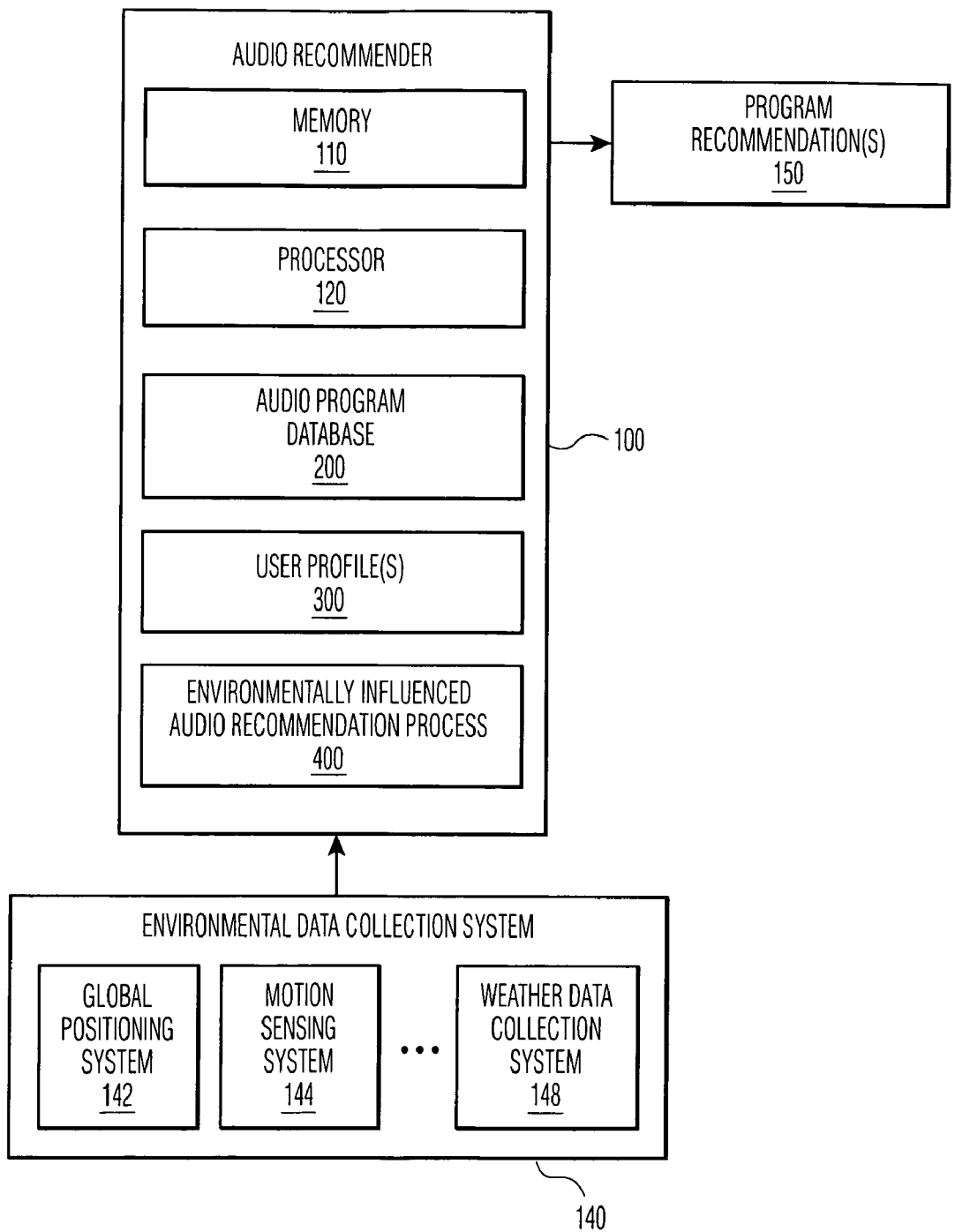
FIG. 1 illustrates a recommender in accordance with the present invention.

FIG. 1 illustrates an audio recommender 100 in accordance with the present invention. While the present invention is illustrated herein in the context of audio content recommendations, the present invention can be applied to any automatically generated recommendations that are based on an evaluation of user behavior, such as a listening history, viewing history or purchase history. The present invention is particularly applicable in a mobile environment, such as an automobile, where a user may desire a program selection in an unfamiliar area, based on the current location or characteristics of the location.

As shown in FIG. 1, the audio recommender 100 evaluates each of the programs in an audio program database 200 to generate one or more program recommendation(s) 150 indicating audio programs of interest to a user. According to one feature of the present invention, the audio recommender 100 makes recommendations based on the preferences of the user and environmental characteristics, such as location, characteristics of the location or weather. Thus, according to another feature of the present invention, the audio recommender 100 learns the users preferences under various environmental characteristics using an environmental data collection system 140.

For example, the audio recommender 100 may learn that a given user prefers Jazz music in New Orleans, a radio station with frequent traffic reports when leaving an urban setting (or when the movement is characterized by stop-and-go traffic) and a radio station with a "Top 40" program type when the weather is sunny and above 55 degrees. Once derived, the user's preferences under various environmental characteristics are recorded in one or more user profile(s) 360, discussed below in conjunction with FIG. 3.

The observed environmental characteristics may include, for example, location, characteristics of the location, weather or characteristics of the motion, such as the rate of movement The location can be derived, for example, from a global positioning system (GPS) 142 or an enhanced cellular 911 (E911) system (not shown). The current location indicated by the GPS 142 can be utilized to index an atlas or another reference to derive characteristics of the location, such as whether the location is urban or wral, its average weather, and its proximity to an urban area. The characteristics of the movement can be derived from a motion sensing system 144, such as rate of motion from a speedometer. The weather can be derived, for example, from a weather data collection system 148, which may be embodied as a link to a weather database (indexed by the location identified by the GPS system 142) or as an external thermometer that monitors external air temperature.

As discussed below in conjunction with FIG. 4, when recommending an alternate radio station or another item, the audio recommender 100 retrieves the user profile(s) 360, and evaluates the current environmental characteristics. Thereafter, the audio recommender 100 generates a recommendation score based on the users demonstrated preferences under similar environmental characteristics, such as in the same or a similar geographic area or under similar weather conditions. In this manner, the audio recommender 100 generates one or more program recommendations 150 identifying radio stations that are likely of interest to the user.

As shown in FIG. 1, the audio recommender 100 contains an audio program database 200, one or more viewer profiles 360, and an environmentally influenced audio recommendation process 400, each discussed further below in conjunction with FIGS. 2 through 4, respectively. Generally, the audio program database 200 records information for each radio station in the exemplary embodiment. One illustrative viewer profile 360, shown in FIG. 3C, is generated by a decision tree recommender, based on an exemplary viewing history 300, shown in FIGS. 3A and 3B. In an alternate implementation, an explicit viewer profile may be employed. An explicit viewer profile may be generated from a viewer surveythat provides a rating for each program feature and environmental characteristic, for example, on a numerical scale that is mapped to various levels of interest between "hates" and "loves," indicating whether or not a given viewer watched each program feature. The environmentally influenced audio recommendation process 400 generates the program recommendations 150 based on the preferences of the user and environmental characteristics, such as location, characteristics of the location or weather.

The audio recommender 100 may be embodied as any article of manufacture, any computing device, such as a personal computer or workstation, that contains a processor 120, such as a central processing unit (CPU), and memory 110, such as RAM and/or ROM. In addition, the audio recommender 100 may be embodied in a similar manner to available television program recommenders, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees," U.S. patent application Ser. No. 09/498,271, filed Feb. 4, 2000, entitled "Bayesian TV Show Recommender," and U.S. patent application Ser. No. 09/627,139, filed Jul. 27, 2000, entitled "Three-Way Media Recommendation Method and System," or any combination thereof, as modified herein to carry out the features and functions of the present invention. In a further variation, the audio recommender 100 may be embodied as an application specific integrated circuit (ASIC) that may be incorporated, for example, in a car radio. In an even further aspect, the recommendation generating invention described herein may be embodied as computer readable code on a computer readable medium.

FIG. 2 is a sample table from the audio program database 200 of FIG. 1 that records information for each radio station that is available. As shown in FIG. 2, the audio program database 200 contains a plurality of records, such as records 205 through 220, each associated with a given radio station program. For each radio station program, the program database 200 indicates the date/time and radio associated with the program in fields 240 and 245, respectively. In addition, the geographic region associated with the radio station is specified in field 248. The title, program type(s) and performers for each program are identified in fields 250, 255 and 270, respectively. Additional well-known features (not shown), such as duration and description of the program, can also be included in the audio program database 200. The audio program database 200 may be embodied, for example, using the radio station locator database found at www.radio-locator.com.

FIGS. 3A and 3B, collectively are a table illustrating an exemplary listening history 300 that is maintained by a decision tree television recommender. The positive examples 300-1 are set forth in FIG. 3A and the negative examples 300-2 are set forth in FIG. 3B. As shown in FIG. 3A, the listening history 300-1 contains a plurality of records 301-303 each associated with a different user listening session. As shown in FIG. 3B, the negative examples of the listening history 300-2 contain a plurality of records 305-307 each associated with a randomly selected program that the user did not listen to.

As shown in FIGS. 3A and 3B, for each session, the listening history 300 identifies various features in fields 320-350. The values set forth in fields 320-340 may be typically obtained from the audio program guide 200. The values set forth in field 345 may be obtained from the data collected from the environmental data collection system 140 in accordance with the present invention.

FIG. 3C is a table illustrating an exemplary user profile 360 that may be generated by a decision tree television recommender from the listening history 300 set forth in FIGS. SA and 3B. As shown in FIG. 3C, the decision tree user profile 360 contains a plurality of records 371-374 each associated with a different rule specifying user preferences under various environmental characteristics. In addition, for each rule identified in column 380, the user profile 360 identifies the conditions associated with the rule in field 385 and The corresponding recommendation in field 390. For a more detailed discussion of the generation of profiles in a decision tree recommendation system, see, for example, U.S. patent application Ser. No. 09/466,406, filed Dec. 17, 1999, entitled "Method and Apparatus for Recommending Television Programming Using Decision Trees," incorporated by reference above.

The environmental factors can be emphasized in the recommendation score, for example, by allowing a user to assign a weight each feature that is utilized to compute the overall score. In a further variation, the rules can be ordered in accordance with the number of environmental characteristics appearing in the conditions of each rule, or as selected by the user.

Figure 4:
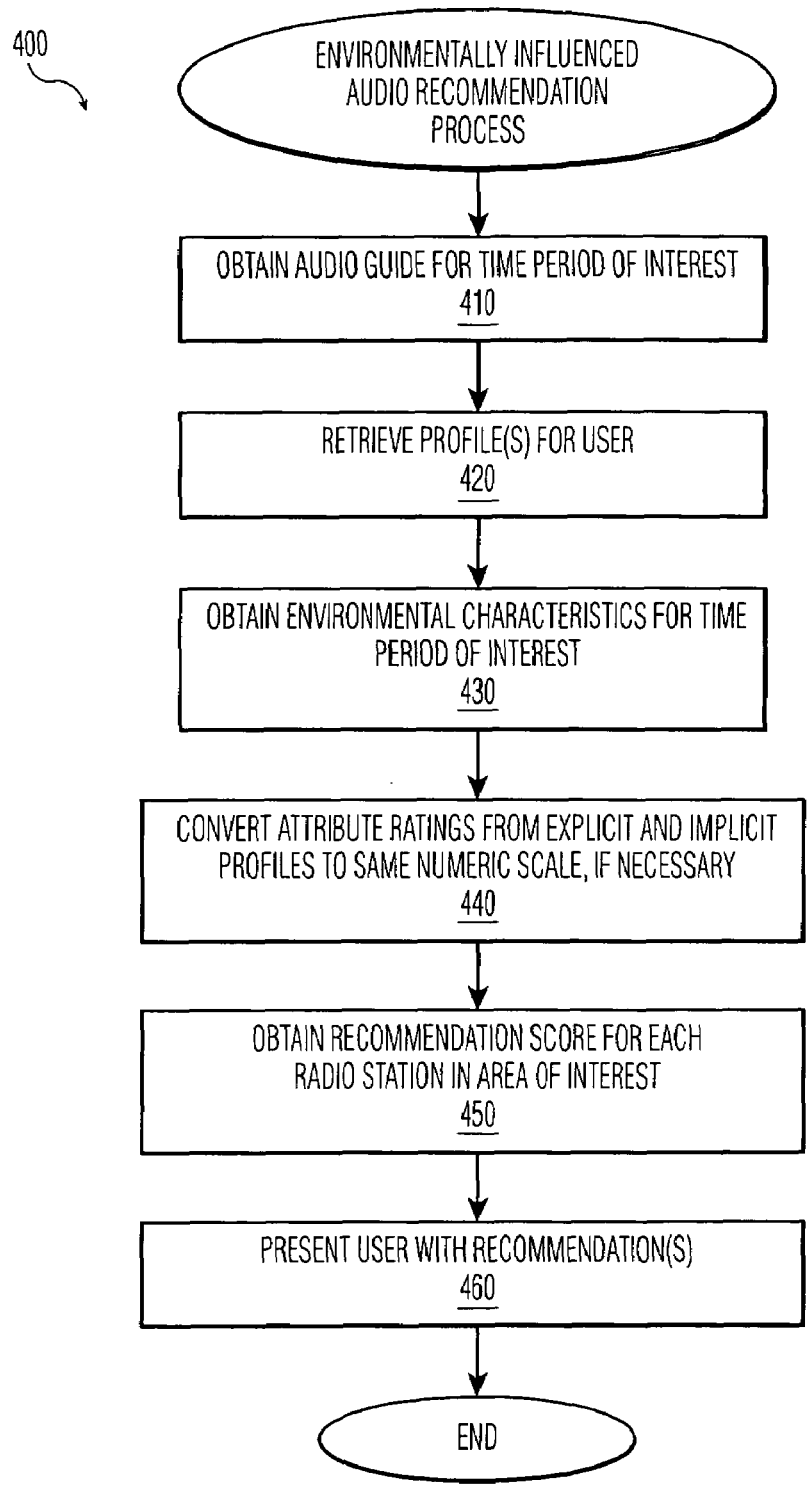
FIG. 4 is a flow chart describing an exemplary environmentally influenced audio recommendation process embodying principles of the present invention.

FIG. 4 is a flow chart describing an exemplary environmentally influenced audio recommendation process 400. The environmentally Influenced audio recommendation process 400 generates the program recommendations 150 based on the preferences of the user and environmental characteristics, such as location, characteristics of the location or weather.

As shown in FIG. 4, the environmentally influenced audio recommendation process 400 initially obtains the audio program guide 200 during step 410 for the time period (and geographic region) of interest. Thereafter, the appropriate user profile(s) 360 are obtained during step 420 and the environmental characteristics are obtained during step 430 for the time period of interest. As previously indicated, the environmental characteristics obtained during step 430 may include one or more of location, characteristics of the location, weather or characteristics of the motion, such as the rate of movement. The environmentally influenced audio recommendation process 400 then converts the numeric ratings for each attribute from the various user profiles 360 to the same numeric scale, if necessary, during step 440.

The rules set forth in the user profile 360 are applied to the audio program guide 200 for each radio station in the geographic region of interest during step 450 to identify the first rule that is satisfied by the features of the radio station and the indicated environmental characteristics. Once a rule is satisfied for each radio station, the corresponding recommendation score is retrieved from field 390. The recommendation score may be calculated by a decision tree recommendation system in accordance with the techniques described in U.S. patent application Ser. No. 09/466,406, filed Dec. 17, 1999, entitled "Method and Apparatus for Recommending Television Programming Using Decision Trees," incorporated by reference above. For a discussion of the calculation of the recommendation score by a Bayesian recommendation system, see, for example, U.S. patent application, filed Feb. 4, 2000, entitled "Bayesian Television Show Recommender," (Attorney Docket Number U.S.000018), incorporated by reference herein.

The user is presented with the generated recommendation (s) during step 460, before program control terminates.

It is to be understood that the embodiments and variations shown and described herein are merely illustrative of the principles of this invention and that various modifications may be implemented by those skilled in the art without departing from the scope and spirit of the invention.

What is claimed is:

1. A method for recommending an item to a user, comprising the steps of:
    observing one or more environmental characteristics;
    learning preferences of said user for each item to be recommended while exposed to and under said one or more observed environmental characteristics; and
    generating a recommendation score for said item based on features of said item and said learned preferences of said user under said one or more observed environmental characteristics, wherein said one or more observed environmental characteristics includes at least one of a weather condition, a characteristic of motion of said user, a location, and one or more characteristics of said location and each of the one or more observed environmental characteristics is associated with a weight assigned by the user.

2. The method of claim 1, wherein said item is a radio station.

3. The method of claim 1, wherein said item is content.

4. The method of claim 1, wherein said item is a product.

5. The method of claim 1, wherein said learned preferences of said user under said one or more environmental characteristics are recorded in a profile.

6. The method of claim 5, wherein said learned preferences of said user under said one or more environmental characteristics are recorded in a profile as a set of rules by a decision tree recommender.

7. A method for recommending an item to a user, comprising the steps of:
    observing one or more environmental characteristics for obtaining information characterizing said one or more environmental characteristics for a given time;
    learning preferences of said user for each item to be recommended while said user is exposed to and affected by said one or more observed environmental characteristics; and
    generating a recommendation score for said item based on features of said item, and said learned preferences of said user under said one or more observed environmental characteristics for a given time, wherein said one or more observed environmental characteristics includes at least one of a weather condition and a characteristic of motion of said user and each of the one or more observed environmental characteristics is associated with a weight assigned by the user.

8. The method of claim 7, wherein said item is a radio station.

9. The method of claim 7, wherein said item is content.

10. The method of claim 7, wherein said item is a product.

11. The method of claim 7, wherein said one or more observed environmental characteristics is a user location at said given time.

12. The method of claim 7, wherein said one or more observed environmental characteristics is one or more characteristics of a location.

13. The method of claim 7, wherein said observed preferences of said user under said one or more environmental conditions are recorded in a profile.

14. The method of claim 13, wherein said observed preferences of said user under said one or more environmental conditions are recorded in a profile as a set of rules by a decision tree recommender.

15. A system for recommending an item to a user, comprising:
    a memory for storing computer readable code; and
    a processor operatively coupled to said memory, said processor configured to:
        observe one or more environmental characteristics for obtaining information characterizing said one or more environmental characteristics for a given time
        learn preferences of said user for each item to be recommended while exposed to and under said one or more observed environmental characteristics; and
        generate a recommendation score for said item based on features of said item and said learned preferences of said user under said one or more observed environmental characteristics, wherein said one or more observed environmental characteristics includes at least one of a weather condition and a characteristic of motion of said user and each of the one or more observed environmental characteristics is associated with a weight assigned by the user.

16. The system of claim 15, wherein said item is a radio station.

17. The system of claim 15, wherein said item is content.

18. The system of claim 15, wherein said item is a product.

19. The system of claim 15, wherein said one or more observed environmental characteristics is a location.

20. The system of claim 15, wherein said one or more observed environmental characteristics is one or more characteristics of location.

21. The system of claim 15, wherein said learned preferences of said user under said one or more environmental characteristics are recorded in a profile.

22. The system of claim 21, wherein said learned preferences of said user under said one or more environmental characteristics are recorded in a profile as a set of rules by a decision tree recommender.

23. A system for recommending an item to a user, comprising:
    a memory for storing computer readable code; and
    a processor operatively coupled to said memory, said processor configured to:
        observe at least one motion characteristic for obtaining information characterizing said one or more environmental characteristics for a given time;
        learn preferences of said user for each item to be recommended while exposed to and under said characteristic of motion;
        obtain information characterizing said characteristic of motion of said user for a given time; and
        generate a recommendation score for said item based on features of said item, and said learned preferences of said user under said characteristic of motion of said user and each of the one or more observed environmental characteristics is associated with a weight assigned by the user.

24. The system of claim 23, wherein said learned preferences of said user under said one or more environmental characteristics are recorded in a profile.

25. The system of claim 24, wherein said learned preferences of said user under said one or more environmental characteristics are recorded in a profile as a set of rules by a decision tree recommender.

26. A computer readable medium having computer readable code means embodied thereon for recommending an item to a user, said computer readable program code means comprising:
    a step to learn preferences of said user for each item to be recommended while exposed to and under one or more observed environmental characteristics; and
    a step to generate a recommendation score for said item based on features of said item and said learned preferences of said user under said one or more observed environmental characteristics, wherein said one or more environmental characteristics includes at least one of a weather condition and a characteristic of motion of said user and each of the one or more observed environmental characteristics is associated with a weight assigned by the user.

27. The article of manufacture of claim 26, wherein said item includes at least one of a radio station, content and product.

28. The article of manufacture of claim 26, wherein said one or more observed environmental characteristics further includes at least one of a location, and one or more characteristics of said location.

29. The article of manufacture of claim 26, wherein said learneded preferences of said user under said one or more environmental characteristics are recorded in a profile.

30. The article of manufacture of claim 26, wherein said learned preferences of said user under said one or more environmental characteristics are recorded in a profile as a set of rules by a decision tree recommender.

31. A computer readable medium having computer readable code means embodied thereon for recommending an item to a user, said computer readable program code means comprising:
    a step to obtain information characterizing one or more observed environmental characteristics for a given time;
    a step to learn preferences of said user for each item to be recommended by observing said user's personal exposure to one or more observed environmental characteristics; and
    a step to generate a recommendation score for said item based on features of said item, and said learned preferences of said user under said one or more observed environmental characteristics for a given time, wherein said one or more observed environmental characteristics includes at least one of a weather condition and a characteristic of motion of said user and each of the one or more observed environmental characteristics is associated with a weight assigned by the user.

32. The article of manufacture of claim 31, wherein said item includes at least one of a radio station, content and product.

33. The article of manufacture of claim 31, wherein said one or more observed environmental characteristics further includes at least one of a location, and one or more characteristics of said location.

34. The article of manufacture of claim 31, wherein said learned preferences of said user under said one or more environmental characteristics are recorded in a profile.

35. The article of manufacture of claim 31, wherein said learned preferences of said user under said one or more environmental characteristics are recorded in a profile as a set of rules by a decision tree recommender.

* * * * *